E. R. KNORR.
Method of Finding Courses and Bearings on Marine Charts.
No. 28,089. Patented May 1, 1860.
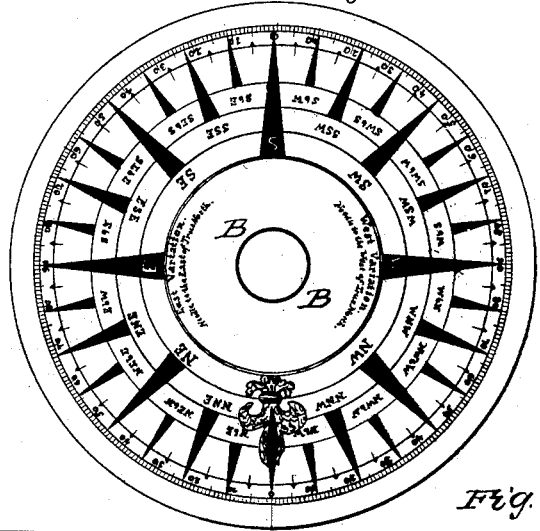
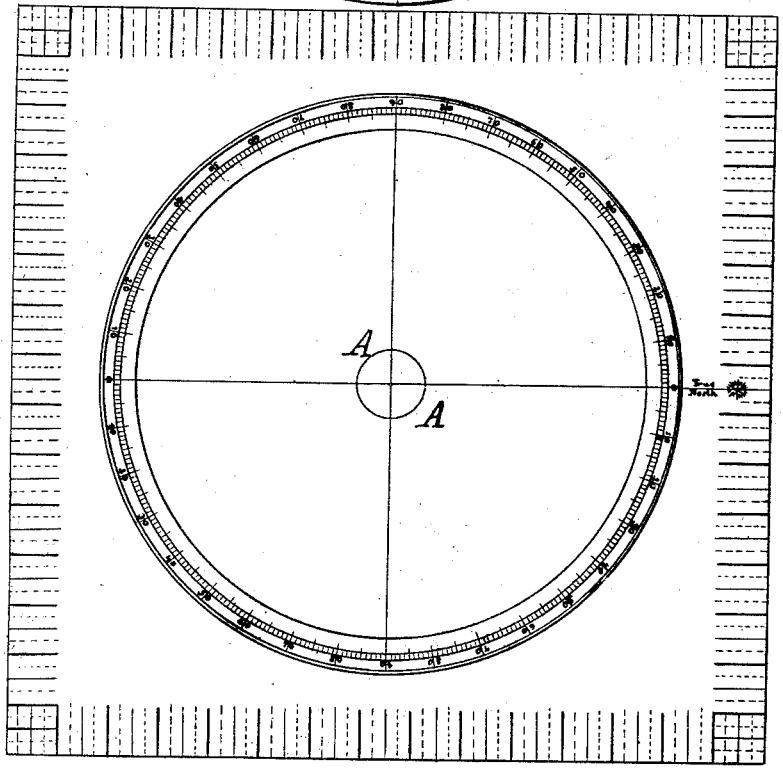
WITNESSES
William H. Dietz.
Thos. G. Clemson
INVENTOR
Ernst Rudolf Knorr

UNITED STATES PATENT OFFICE.

ERNST RUDOLF KNORR, OF WASHINGTON, DISTRICT OF COLUMBIA.

METHOD OF FINDING COURSES AND BEARINGS ON MARINE CHARTS.

Specification of Letters Patent No. 28,089, dated May 1, 1860.

*To all whom it may concern:*

Be it known that I, ERNST RUDOLF KNORR, residing in the city of Washington and in the District of Columbia, have invented a new and useful Instrument for Determining the Courses and Bearings Between any Two Points on Sea and other Charts; and I do hereby declare that the following is a full, clear, and exact description of the construction and operation of the same, reference being had to the annexed drawings, Figures 1 and 2, making a part of this specification.

Fig. 1 is a ship's compass card, printed or marked on paper, pasteboard or wood or engraved on metal, horn, gutta percha or any other fit material. Fig. 2 is a square piece of paper, pasteboard, wood, metal, horn, gutta percha or other fit material, in the middle of which is printed or engraved a circle of a dimension, allowing the compass card just to play within.

This circle is divided in 360 parts, which are marked by figures, starting at both ends of a zero diameter and continuing to the right and to the left. This zero diameter represents the true meridian of a chart and must be parallel to two borders of the card. There may or may not be indicated around the circle points and subdivisions of points of the compass. At the edges of this same card, Fig. 2 are printed or engraved lines or marks for lines, respectively parallel or at right angles to the zero diameter, representing also meridians and parallels of a chart. Out of both cards, Fig. 1 and Fig. 2 a round piece, marked A A and B B is cut, concentric with the compass Fig. 1, and the circle in Fig. 2 and the aperture bedded, if required, with metal. Both cards are put together, the larger below the other, by means of a hollow cylinder of metal or other material, which is inserted through the said aperture and fastened in such a manner, that both cards will allow turning independent of each other around the common center; before fastening them though a ring is added with a ruler attached to it or with a hook, to which a string or wire may be fastened, so as to radiate also independent around the common center.

A screw may be added, to clamp both cards together, if required.

This instrument operates as follows: Put it with the center of the hollow cylinder over one of the points, the bearing of which is sought, adjust the lower card by means of the lines on its edges into the meridian of your chart; adjust the upper card to the compass variation of your place and stretch the string to the other point; where it cuts the compass and the circle, then read respectively the compass and the true bearing.

As my invention I claim—

1. Putting the two movable compass cards together, around a hollow cylinder of metal or any other fit material, so as to allow their adjustment over any point on the charts of conic, orthographic or Meriators projection and to show at once the true and compass bearings between any two points.

2. I claim the ruler, wire or string, radiating from the center in combination with said compass cards for the purposes set forth.

3. I claim putting on both or either cards, constituting my instrument lines or marks parallel or at right angles with the zero or any diameter as means to adjust the instrument into the meridian of the chart, as well for the purpose to use both cards in connection as to use only one, detached from the other, in order to find only one of the relative bearings, either true or compass.

Washington in the District of Columbia April 10th (tenth) 1860.

ERNST RUDOLF KNORR.

Witnesses:
JOHN RODGERS,
L. WALDECKER.